United States Patent
Borie et al.

(10) Patent No.: US 8,985,500 B2
(45) Date of Patent: Mar. 24, 2015

(54) METHOD OF MINIMIZING THE ATTITUDE HUMP PHENOMENON AND A ROTARY WING AIRCRAFT PROVIDED WITH STABILIZER MEANS THEREFOR

(75) Inventors: Sylvie Borie, Velaux (FR); Samuel Leyder, Velaux (FR); Marc Allongue, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 145 days.

(21) Appl. No.: 13/178,011

(22) Filed: Jul. 7, 2011

(65) Prior Publication Data

US 2012/0018570 A1 Jan. 26, 2012

(30) Foreign Application Priority Data

Jul. 20, 2010 (FR) ...................................... 10 03035

(51) Int. Cl.
*B64C 27/00* (2006.01)
*B64C 27/82* (2006.01)

(52) U.S. Cl.
CPC .......... *B64C 27/82* (2013.01); *B64C 2027/8281* (2013.01)
USPC ...................................... 244/17.11; 244/45 R

(58) Field of Classification Search
USPC ........... D12/327, 335, 338; 244/17.11, 17.17, 244/45 R
See application file for complete search history.

(56) References Cited

U.S. PATENT DOCUMENTS

| | | | |
|---|---|---|---|
| 2,369,652 A | * | 2/1945 | Avery .......................... 244/17.13 |
| D188,226 S | * | 6/1960 | Jones ........................... D12/335 |
| 3,583,659 A | | 6/1971 | Lermusiaux |

FOREIGN PATENT DOCUMENTS

| | | |
|---|---|---|
| EP | 0229896 A2 | 7/1987 |
| EP | 1547919 A1 | 6/2005 |
| GB | 606420 A | 8/1948 |
| NL | 16887 | 3/1927 |

OTHER PUBLICATIONS

Search Report and Written Opinion; Application No. FR 1003035; dated Mar. 21, 2011.

* cited by examiner

*Primary Examiner* — Tien Dinh
*Assistant Examiner* — Michael Wang
(74) *Attorney, Agent, or Firm* — Brooks Kushman P.C.

(57) ABSTRACT

A system and method of minimizing the attitude hump phenomenon of a rotary wing aircraft is provided. The rotary wing aircraft includes upper pitching-stabilizer and at least one lower pitching-stabilizer. The lower stabilizer is positioned in a wake of the upper stabilizer generated by a stream of air passing through the rotary wing and impacting against the upper surface of the upper stabilizer.

20 Claims, 2 Drawing Sheets

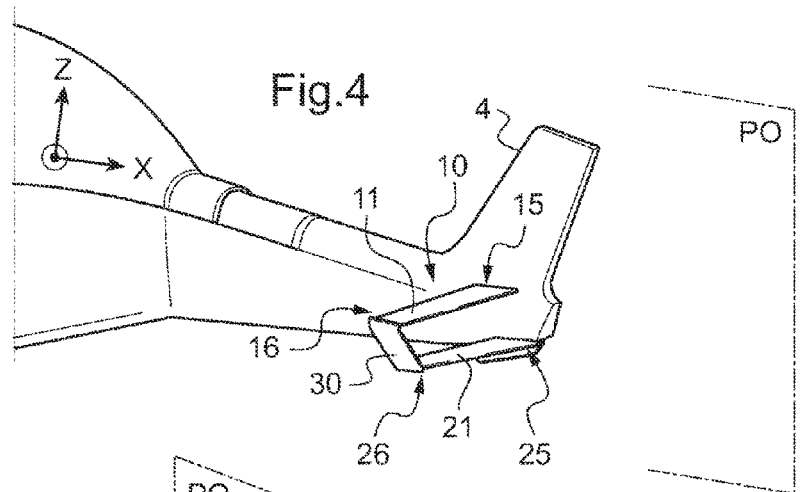
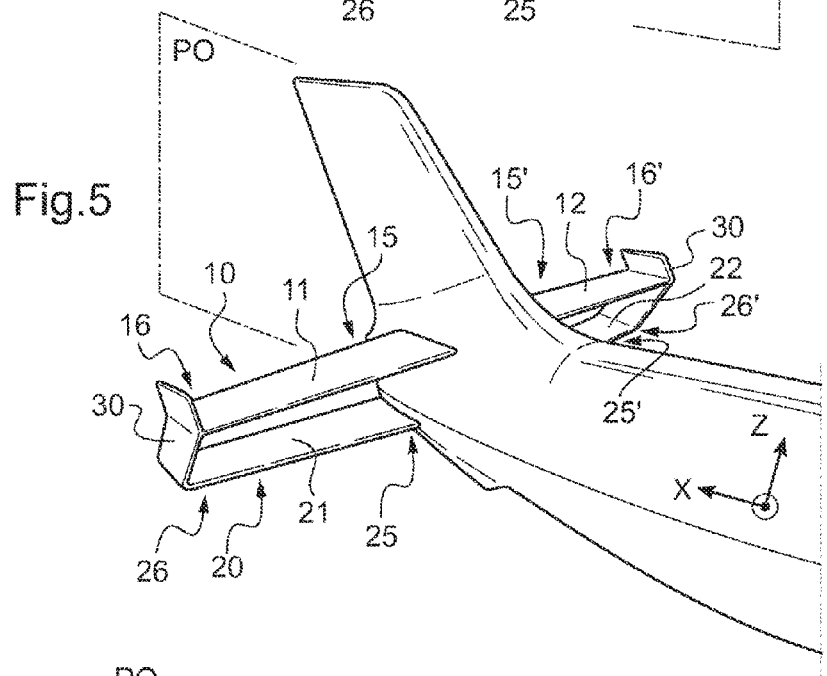
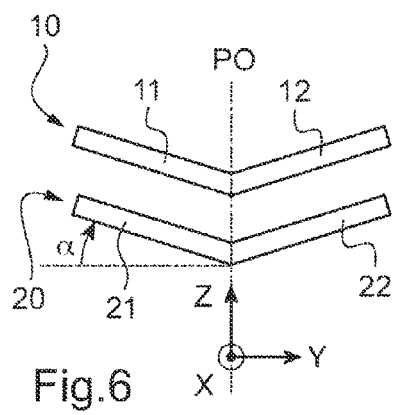
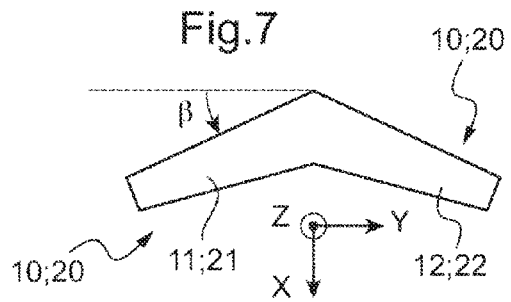

METHOD OF MINIMIZING THE ATTITUDE HUMP PHENOMENON AND A ROTARY WING AIRCRAFT PROVIDED WITH STABILIZER MEANS THEREFOR

CROSS REFERENCE TO RELATED APPLICATIONS

This application claims the benefit of FR 10 03035 filed on Jul. 20, 2010, the disclosure of which is incorporated in its entirety by reference herein.

BACKGROUND OF THE INVENTION (1) Field of the Invention

The present invention relates to a method of minimizing the attitude hump phenomenon and to a rotary wing aircraft provided with means for performing the method and in particular a helicopter.

(2) Description of Related Art

Conventionally, a helicopter comprises an airframe extending longitudinally from a front end to a rear end on either side of an antero-posterior plane of symmetry, and in a vertical direction from a bottom portion fitted with landing gear towards a top portion fitted with a main lift and propulsion rotor.

Furthermore, the airframe has a tail rotor at its rear end. The tail rotor serves to counter the torque exerted by the main rotor on the airframe, and it also enables the pilot to control yaw movements of the helicopter.

Furthermore, a helicopter sometimes has additional stabilizer surfaces. For example, it is common practice to fit a helicopter with a yaw stabilizer surface, e.g. contained in the antero-posterior plane in order to combat said torque at high speed.

Similarly, a helicopter sometimes has pitching-stabilizer means presenting an angle having an absolute value lying in the range 0° to 90° relative to said antero-posterior plane, said pitching-stabilizer means comprising, for example, two pitching-stabilizer surfaces extending symmetrically on either side of said antero-posterior plane.

Such pitching-stabilizer means are sometimes referred to as a "horizontal stabilizer".

The pitching-stabilizer means are very effective, with the effectiveness thereof increasing with increasing forward speed of the helicopter. Furthermore, it can be understood that the effectiveness of pitching-stabilizer means is maximized by maximizing its wing area.

However, on a traditional helicopter flying in translation at low speed or even hovering, the air that passes through the main rotor is deflected rearwards and impacts against the pitching-stabilizer means. This air passing through the rotor then exerts on the pitching-stabilizer means forces that the pilot needs to compensate by operating the flight controls.

Nevertheless, when flying conditions vary, the deflection of said air is also modified. The same applies to the forces exerted on the pitching-stabilizer means.

This phenomenon is referred to as an "attitude hump" by the person skilled in the art.

While accelerating or decelerating, the attitude hump, i.e. the forces exerted by the air passing through the main rotor and impacting against the pitching-stabilizer means, tends to give the helicopter a nose-up attitude. In order to stabilize the speed of the helicopter, the pilot then needs to use the control stick for controlling the cyclic pitch of the blades of the main rotor so as to reduce the nose-up attitude of the helicopter.

As the forward speed of the helicopter increases, the air stream coming from the main rotor becomes deflected towards the forward axis and therefore passes over the pitching-stabilizer means and no longer gives rise to the attitude hump phenomenon.

It can be understood that optimizing the pitching-stabilizer means by maximizing its wing area accentuates the attitude hump.

Under such circumstances, it would appear to be impossible to use pitching-stabilizer means having a large wing area on a helicopter, without that giving rise to an increase in the attitude hump phenomenon.

It should be observed that the technological background includes Document EP 1 547 919 relating to a helicopter provided with pitching-stabilizer means. Those stabilizer means may comprise two pitching-stabilizer surfaces extending symmetrically on either side of said antero-posterior plane.

The stabilizer surfaces may be horizontal by being orthogonal to the antero-posterior plane, for example, or they may together describe a V-shape, by presenting an angle lying in the range 0° to 90° relative to said antero-posterior plane.

Each pitching-stabilizer surface may be fitted with a flap.

Thus, EP 0 229 896 describes a rotary wing aircraft having upper pitching-stabilizer means vertically above lower pitching-stabilizer means. Such a device is sometimes referred to as a "multi-plane stabilizer".

Documents U.S. Pat. No. 2,369,652 and GB 606420 relate to a rotary wing aircraft having upper pitching-stabilizer means and lower pitching-stabilizer means that are slightly offset relative to a longitudinal direction of the aircraft.

Furthermore, the teaching of documents U.S. Pat. No. 3,583,659 and NL 0 229 896 is also known.

Those documents provide teaching that is of interest, but it nevertheless remains remote from minimizing the attitude hump phenomenon.

SUMMARY OF THE INVENTION

An object of the present invention is thus to propose a method and a device enabling the attitude hump phenomenon to be minimized in a rotary wing aircraft having pitching-stabilizer members that are likely to be impacted by an air stream coming from said rotary wing.

According to the invention, a method of minimizing the attitude hump phenomenon relating to a rotary wing aircraft having an airframe extending longitudinally from a front end to a rear end together with upper pitching-stabilizer means and at least one lower pitching-stabilizer means, is remarkable in that each lower stabilizer means is placed in a wake from said upper stabilizer means as generated by a stream of air passing through said rotary wing and impacting against the upper surface of the upper stabilizer means.

It is recalled that a wake corresponds to a region downstream from an obstacle placed in a moving fluid, in which region the fluid is at rest relative to the obstacle. Thus, each lower stabilizer means is situated in an aerodynamic shadow zone downstream from an upper stabilizer means.

Under such circumstances, in the invention, use is not made of a single stabilizer means having a large wing area that is impacted by a stream of air coming from the rotary wing.

On the contrary, use is made of at least two stabilizer means, including a lower stabilizer means that lies in the wake of an upper stabilizer means.

Consequently, the lower stabilizer means contributes to stabilizing the aircraft in pitching but does not contribute to the attitude hump phenomenon.

This method may posses one or more of the following characteristics.

For example, an upper stabilizer means may be placed between a first plane containing the lower stabilizer means and a second plane containing the rotary wing, the upper stabilizer means being positioned upstream from the lower stabilizer means relative to the forward direction of the aircraft.

In another aspect, the upper stabilizer means comprise an upper stabilizer surface fitted with an upper leading edge and an upper trailing edge and extending transversely from a fixed end secured to the airframe to a free end, the lower stabilizer means comprising a lower stabilizer surface provided with a lower leading edge and a lower trailing edge and extending transversely from a fixed end secured to the airframe of the aircraft to a free end, the lower trailing edge being offset longitudinally relative to the upper trailing edge towards the rear end of the aircraft through a longitudinal distance equal to the product of a maximum chord of the upper stabilizer means multiplied by a coefficient, said multiplier coefficient lying in the range 0 to 3.

It is recalled that the chord of an airfoil is the shortest distance between the leading edge of the airfoil and its trailing edge. The longest chord of each stabilizer surface is then referred to as the "maximum" chord.

The multiplier coefficient is optionally equal to unity, i.e. to one.

In another aspect, each lower stabilizer means is placed in a wake of said upper stabilizer means generated by a stream of air passing through the rotary wing and impacting against an upper surface of an upper stabilizer means when said aircraft has a forward speed slower than a predetermined speed, e.g. equal to 60 knots (kn), i.e. about 30.8 meters per second (m/s).

In addition to a method, the invention also provides a rotary wing aircraft provided with an airframe extending longitudinally, upper pitching-stabilizer means and at least one lower pitching-stabilizer means, and implementing the invention.

The aircraft is then remarkable in particular in that each lower stabilizer means is arranged in the wake of an upper stabilizer means generated by a stream of air passing through said rotary wing and impacting against an upper surface of an upper stabilizer means.

This aircraft may in particular include one or more of the following characteristics.

When said upper stabilizer means includes at least one upper stabilizer surface extending transversely from a fixed end secured to an airframe to a free end, the lower stabilizer means includes a lower stabilizer surface extending transversely from a fixed end secured to an airframe to a free end, said lower stabilizer surface being arranged in the wake of said upper stabilizer surface generated by a stream of air passing through said rotary wing and impacting against a pressure side of said upper stabilizer surface.

Furthermore, the free end of the upper stabilizer surface is optionally connected to the free end of the corresponding lower stabilizer surface by means of an airfoil that is more or less plane.

Furthermore, when said upper stabilizer means includes an upper stabilizer surface provided with an upper leading edge and an upper trailing edge and extends transversely from a fixed end secured to an airframe to a free end, and when said lower stabilizer means include a lower stabilizer surface provided with a lower leading edge and a lower trailing edge and extends transversely from a fixed end secured to an airframe to a free end, the lower trailing edge is offset longitudinally relative to the upper trailing edge towards the rear of the aircraft through a longitudinal distance equal to the product of a maximum chord of the upper stabilizer means multiplied by a coefficient, said multiplier coefficient lying in the range 0 to 3.

BRIEF DESCRIPTION OF THE DRAWINGS

The invention and its advantages appear in greater detail from the context of the following description of embodiments given by way of illustration with reference to the accompanying figures, in which:

FIG. 4 is a diagram of an aircraft in a first embodiment;

FIG. 5 is a diagram of an aircraft in a second embodiment;

FIG. 6 is a diagram of an aircraft in a first variant of the invention; and

FIG. 7 is a diagram of an aircraft in a second variant of the invention.

DETAILED DESCRIPTION OF THE PREFERRED EMBODIMENTS

Elements present in more than one of the figures are given the same references in each of them.

It should be observed that three mutually orthogonal directions X, Y, and Z are shown in the figures.

The direction X is said to be longitudinal. The term "longitudinal" relates to a long dimension of the structures described along said longitudinal direction X.

Another direction Y is said to be transverse.

Finally, a third direction Z is said to be in elevation and it corresponds to the height dimensions of the structures described. The term "thickness" then relates to a dimension in elevation of the structures described along said elevation direction.

The X,Z plane is the antero-posterior plane of symmetry of the aircraft shown.

Figure 1:
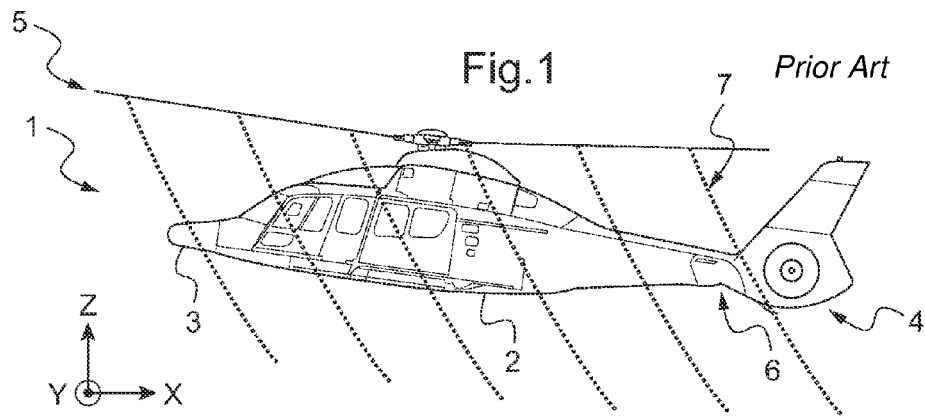
FIGS. 1 and 2 are diagrams showing an aircraft of the prior art.
Figure 2:
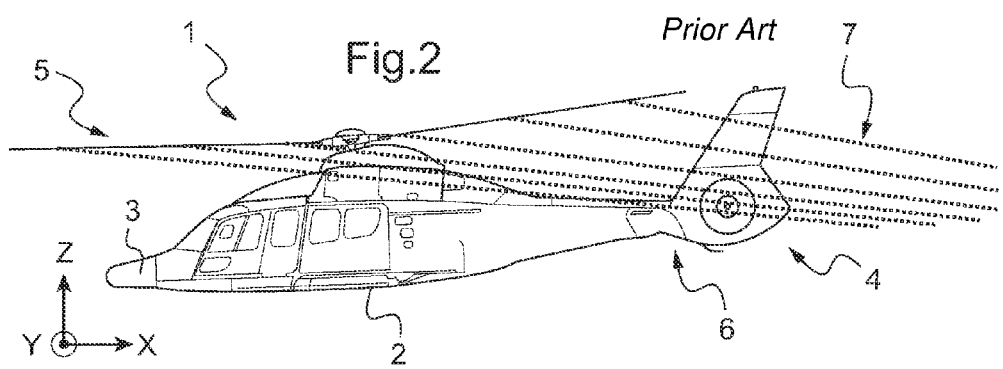

FIGS. 1 and 2 show an aircraft 1 of the prior art.

With reference to FIG. 1, the aircraft 1 comprises an airframe 2 extending longitudinally from a front end 2 to a rear end 4. The airframe 2 carries a rotary wing 5 having a lift rotor.

Furthermore, the rear end 4 is provided with pitching-stabilizer means 6 extending transversely from the airframe 2. The wing area of these stabilizer means 6 is maximized to optimize its effectiveness.

At low speed, i.e. when the forward speed of the aircraft is less than a predetermined speed, e.g. equal to 60 kn i.e. about 30.8 m/s, the air stream 7 passing through the rotary wing 5 impacts against the upper surface of the stabilizer means 6.

Conversely, at high speed, the air stream 7 flows above the stabilizer means 6.

This varying impact of the air stream 7 on the stabilizer means 6 gives rise to an "attitude hump" phenomenon.

Figure 3:
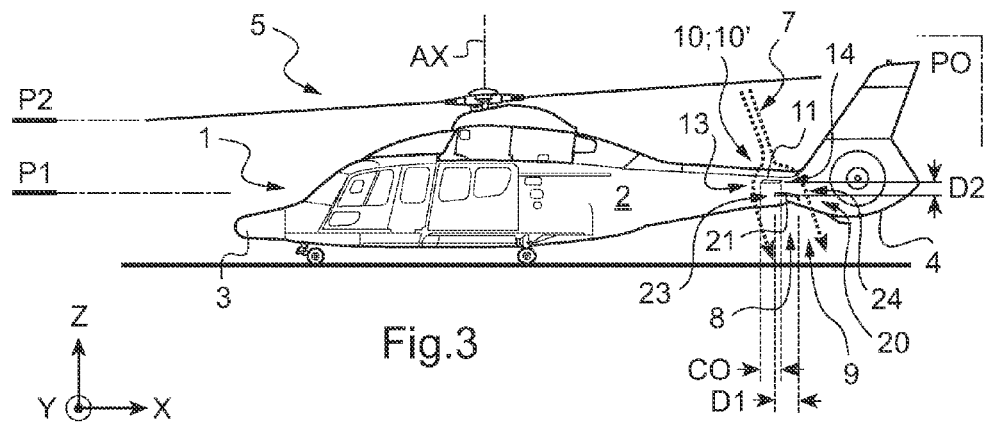
FIG. 3 is a side view of an aircraft of the invention explaining the method that is implemented.

FIG. 3 shows a rotary wing aircraft 1 applying the method of the invention for minimizing this attitude hump phenomenon.

The aircraft 1 comprises an airframe 2 extending longitudinally from a front end 2 to a rear end 4, the airframe 2 carrying a rotary wing 5 having a lift rotor. The airframe 2 is located on either side of an antero-posterior plane P0 of symmetry.

Furthermore, the aircraft 1 includes upper pitching-stabilizer means 10 and at least one lower pitching-stabilizer means 20.

The upper pitching-stabilizer means 10 comprises at least one pitching-stabilizer surface 11 that is optionally tiltable and/or fitted with at least one flap and that extends transversely from the airframe 2, optionally presenting a negative or positive dihedral angle. Likewise, the lower pitching-stabilizer means 20 includes at least one pitching-stabilizer surface 21 that is optionally tiltable and/or fitted with at least one flap and that extends transversely from the airframe 2, optionally presenting a positive or negative dihedral angle.

Each lower stabilizer surface 21 co-operates with an upper stabilizer surface 11.

According to the invention, each lower stabilizer means 20 is placed in a wake 8 of corresponding upper stabilizer means 10. The wake is generated by the air stream 7 passing through the rotary wing 5 and impacting on an upper surface 10' of the upper stabilizer means 10.

Thus, instead of using pitching-stabilizer means having a large wing area, use is made of upper stabilizer means and at least one lower stabilizer means, each presenting a minimized wing area.

Consequently, each lower stabilizer surface 21 of a lower stabilizer means 20 is arranged in the wake of an upper stabilizer surface 11 of upper stabilizer means 10. This wake results from the impact of the air stream 7 passing through rotary wing 5 against the upper stabilizer surface 11.

At low speed, i.e. below a predetermined speed of the aircraft, e.g. 60 kn, i.e. about 30.8 m/s, in a forward direction 100, the air stream 7 coming from the rotary wing 5 thus impacts against the upper surface 10' of the upper stabilizer means 10, but does not impact directly against the upper surface of the lower stabilizer means 20.

By placing the lower stabilizer means 20 in the wake of upper stabilizer means 10, and thus in a zone 9 of aerodynamic shadow relative to the air stream 7 coming from the rotary wing, it is guaranteed that this air stream 7 does not impact directly against the lower stabilizer means 20. The attitude hump phenomenon is thus reduced compared with the operation of a conventional aircraft.

In accordance with the preferred variant of FIG. 3, the upper stabilizer means 10 are arranged between a first plane P1 orthogonal to the antero-posterior plane P0 passing through the lower stabilizer means 20 and a second plane P2 orthogonal to the antero-posterior plane P0 in which the rotary wing 5 moves, e.g. during hovering flight.

Furthermore, the upper stabilizer means 10 are positioned upstream from the lower stabilizer means 20 relative to the forward direction 100 of the aircraft 1.

Thus, the smaller distance between the axis of rotation of a rotor of the rotary wing from an upper stabilizer surface 10 is less than the shortest distance between said axis of rotation and a lower stabilizer surface co-operating with the upper stabilizer surface.

For example, the lower trailing edge 24 of a lower stabilizer surface 21 is offset longitudinally in a longitudinal direction X relative to the upper trailing edge 14 of the corresponding upper stabilizer surface 11 through a longitudinal distance D1 towards the rear end 4.

The trace of the upper trailing edge 14 of the upper stabilizer surface 11 is then separated from the trace of the lower trailing edge 24 of a lower stabilizer surface 21 firstly by a horizontal offset equal to said longitudinal distance D1 and secondly by an elevation offset D2.

For the upper stabilizer surface 11 of the upper stabilizer means 10 presenting a maximum chord C0, the longitudinal distance D1 is equal to the product of the maximum chord C0 multiplied by a coefficient K. The multiplier coefficient K lies in the range 0 to 3, and is preferably equal to unity.

In the first embodiment of FIG. 4, the upper stabilizer means 10 has a single upper stabilizer surface 11 extending from a fixed end 15 secured to the airframe 2 towards a free end 16.

Likewise, a lower stabilizer means 20 comprises a single lower stabilizer surface 21 extending from a fixed end 25 secured to the airframe 2 towards a free end 26.

The free end 16 of the upper stabilizer surface may be connected to the free end 26 of the lower stabilizer surface 21 by a more or less vertical airfoil 30, such as a side plate, for example.

In the second embodiment of FIG. 5, the upper stabilizer means 10 has a first upper stabilizer surface extending in a first direction from a fixed end 15 secured to the airframe 2 to a free end 16, and a second upper stabilizer surface 12 extending in a second direction opposite from the first direction from a fixed end 15' secured to the airframe 2 towards a free end 16'.

The first upper stabilizer surface 11 and the second upper stabilizer surface 12 may be symmetrical about the antero-posterior plane P0.

Likewise, the lower stabilizer means 20 comprise a first lower stabilizer surface 21 extending in a first direction from a fixed end 25 secured to the airframe 2 towards a free end 26 and a second lower stabilizer surface 22 extending in an opposite second direction from a fixed end 25' secured to the airframe 2 towards a free end 26'.

The lower upper stabilizer surface 21 and the second lower stabilizer surface 22 may be symmetrical about the antero-posterior plane P0.

It can be understood that it is conceivable to use a plurality of lower stabilizer means, each lower stabilizer means 20 lying in the wake 8 of the upper stabilizer means 10 as generated by a stream of air passing through the rotary wing 5 and impacting against the upper surface 10' of an upper stabilizer means 10.

Independently of the embodiment, each stabilizer surface may present a dihedral angle, which dihedral angle is positive in the version as shown in FIG. 6 or negative with an angle of inclination α lying in the range 0 to ±90° relative to the antero-posterior plane P0.

Similarly, with reference to the variant of FIG. 7, and independently of the embodiment, each stabilizer surface may be swept forwards or rearwards and thus present an angle of inclination β so as to be directed towards the rear end or towards the front end of the aircraft.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of minimizing the attitude hump phenomenon relating to a rotary wing aircraft having an airframe extending longitudinally from a front end to a rear end, the method comprising:

providing an upper pitching-stabilizer means and at least one lower pitching-stabilizer means; and positioning the lower stabilizer means offset towards the rear end from the upper stabilizer by a longitudinal distance being generally equal to a maximum longitudinal chord of the upper stabilizer means such that the lower stabilizer means is arranged in an aerodynamic shadow of a stream of air passing through said rotary wing and impacting against the upper surface of the upper stabilizer means such that the upper stabilizer means at least partially blocks the stream of air from the lower stabilizer means when the aircraft has a forward speed slower than a predetermined speed.

2. The method according to claim 1 further comprising, positioning the upper stabilizer means between a first plane containing the lower stabilizer means and a second plane containing the rotary wing; and positioning the upper stabilizer means offset longitudinally from the lower stabilizer means toward the front end of the aircraft.

3. The method according to claim 1, wherein said upper stabilizer surface includes an upper leading edge and an upper trailing edge and extending transversely from a fixed end secured to the airframe to a free end, the lower stabilizer means comprising a lower stabilizer surface including a lower leading edge and a lower trailing edge and extending transversely from a fixed end secured to the airframe to a free end, the lower trailing edge being offset longitudinally relative to the upper trailing edge towards the rear end by the longitudinal distance.

4. The method according to claim 1 wherein the lower stabilizer means is positioned in the wake of the upper stabilizer means generated by the stream of air passing through the rotary wing and impacting against an upper surface of an upper stabilizer means.

5. The method according to claim 1, further comprising positioning the upper stabilizer means and the lower stabilizer means longitudinally forward of a rear rotor.

6. The method according to claim 1, further comprising providing an airfoil extending between and connecting the upper stabilizer means to the lower stabilizer means.

7. The method according to claim 1, wherein the lower stabilizer means is offset by an elevation distance being less than the longitudinal distance.

8. A rotary wing aircraft comprising:
an airframe extending longitudinally from a front end to a rear end;
an upper pitching-stabilizer means extending transversely from the rear end; and
at least one lower pitching-stabilizer means, extending transversely from the rear end and offset towards the rear end from the upper stabilizer means by a longitudinal distance being generally equal to a maximum longitudinal chord of the upper stabilizer means and offset by an elevation distance being less than the longitudinal distance such that the lower stabilizer means is arranged in an aerodynamic shadow of a stream of air passing through said rotary wing and impacting against an upper surface of an upper stabilizer means such that the upper stabilizer means at least partially blocks the stream of air from impacting the lower stabilizer means when the aircraft has a forward speed slower than a predetermined speed.

9. The rotary wing aircraft according to claim 8, wherein the upper surface extends transversely from a fixed end secured to the airframe to a free end, the lower stabilizer means includes a lower stabilizer surface extending transversely from a fixed end secured to the airframe to a free end, the lower stabilizer surface being arranged in the aerodynamic shadow of said upper stabilizer surface generated by the stream of air passing through the rotary wing and impacting against a pressure side of the upper stabilizer surface.

10. The rotary wing aircraft according to claim 9, wherein the free end of the upper surface is connected to the free end of the lower stabilizer surface by an airfoil.

11. The rotary wing aircraft according to claim 8, wherein when upper surface is provided with an upper leading edge and an upper trailing edge and extends transversely from a fixed end secured to the airframe to a free end, and the lower stabilizer means includes a lower stabilizer surface provided with a lower leading edge and a lower trailing edge and extends transversely from a fixed end secured to the airframe to a free end, the lower trailing edge being offset longitudinally relative to the upper trailing edge towards the rear end of the aircraft by the longitudinal distance.

12. The rotary wing aircraft according to claim 8, wherein the upper stabilizer means and the lower stabilizer means are located longitudinally forward of a rear rotor.

13. The rotary wing aircraft according to claim 8, further comprising an airfoil extending between and connecting the upper stabilizer means to the lower stabilizer means.

14. The rotary wing aircraft according to claim 8, wherein the at least one lower pitching-stabilizer means is offset by an elevation distance being less than the longitudinal distance.

15. A rotary wing aircraft having a primary rotor wing and a rear rotor, the aircraft comprising:
an airframe extending in a longitudinal direction from a front end to a rear end;
an upper stabilizer surface extending transversely from the rear end; and
at least one lower stabilizer surface, extending transversely from the rear end and offset towards the rear end from the upper stabilizer surface by a longitudinal distance being generally equal to a maximum longitudinal chord of the upper stabilizer means such that the lower stabilizer surface is arranged in an aerodynamic shadow of an airstream generated by the primary rotary wing and impacting the upper stabilizer surface such that the upper stabilizer surface at least partially blocks the airstream from impacting the lower stabilizer surface,
wherein the upper stabilizer surface and the lower stabilizer surface are located forward of the rear rotor in the longitudinal direction.

16. The rotary wing aircraft according to claim 15, wherein the upper stabilizer surface is secured to the airframe and extends transversely to a free end, and the lower stabilizer surface is secured to the airframe and extends transversely to a free end, wherein an airfoil extends between and connects the upper stabilizer surface free end to the lower stabilizer surface free end.

17. The rotary wing aircraft according to claim 15, wherein when upper stabilizer surface includes an upper leading edge and an upper trailing edge, and the lower stabilizer surfaces includes a lower leading edge and a lower trailing edge, wherein the lower trailing edge is offset longitudinally towards the rear of the aircraft relative to the upper trailing edge by the longitudinal distance.

18. The rotary wing aircraft according to claim 15, an airfoil extending between and connecting the upper stabilizer surface to the lower stabilizer surface.

19. The rotary wing aircraft according to claim 15, wherein the lower stabilizer surface is offset by an elevation distance being less than the lngitudinal distance.

20. The rotary wing aircraft according to claim 19, wherein the coefficient is generally equal to one such that the longitudinal distance is generally equal to the maximum chord of the upper stabilizer surface.

* * * * *